US007668725B2

(12) United States Patent
Alston (10) Patent No.: US 7,668,725 B2
(45) Date of Patent: Feb. 23, 2010

(54) LEAD DISTRIBUTION SYSTEM

(75) Inventor: Michael W. Alston, Norfolk, VA (US)

(73) Assignee: Landmark Communications, Inc., Norfolk, VA (US)

( * ) Notice: Subject to any disclaimer, the term of this patent is extended or adjusted under 35 U.S.C. 154(b) by 331 days.

(21) Appl. No.: 10/305,741

(22) Filed: Nov. 27, 2002

(65) Prior Publication Data

US 2004/0103041 A1 May 27, 2004

(51) Int. Cl.
*G06Q 10/00* (2006.01)
*G06Q 30/00* (2006.01)
*G07G 1/14* (2006.01)

(52) U.S. Cl. .............................. 705/1; 705/14; 705/26
(58) Field of Classification Search .................... 705/26
See application file for complete search history.

(56) References Cited

U.S. PATENT DOCUMENTS

| 6,078,866 | A | | 6/2000 | Buck et al. ..................... 702/2 |
| 6,078,892 | A | * | 6/2000 | Anderson et al. ............. 705/10 |
| 6,236,977 | B1 | | 5/2001 | Verba et al. ................... 705/10 |
| 6,269,361 | B1 | | 7/2001 | Davis et al. ..................... 707/3 |
| 6,314,451 | B1 | | 11/2001 | Landsman et al. .......... 709/203 |
| 6,778,975 | B1 | * | 8/2004 | Anick et al. ................... 707/1 |
| 6,868,389 | B1 | * | 3/2005 | Wilkins et al. ................ 705/10 |
| 7,043,450 | B2 | * | 5/2006 | Velez et al. ................... 705/37 |
| 7,139,732 | B1 | * | 11/2006 | Desenberg ................... 705/37 |
| 7,376,896 | B2 | * | 5/2008 | Ullmann et al. ............. 715/704 |

| 2001/0042064 | A1 | | 11/2001 | Davis et al. ..................... 707/3 |
| 2001/0047354 | A1 | | 11/2001 | Davis et al. ..................... 707/3 |
| 2002/0032575 | A1 | * | 3/2002 | Lang .............................. 705/1 |
| 2002/0077893 | A1 | | 6/2002 | Wolf et al. ..................... 705/14 |
| 2002/0099605 | A1 | | 7/2002 | Weitzman et al. ............. 705/14 |
| 2002/0107776 | A1 | | 8/2002 | Bove et al. ..................... 705/37 |
| 2002/0178213 | A1 | * | 11/2002 | Parry .......................... 709/203 |
| 2003/0046152 | A1 | * | 3/2003 | Colas et al. ................... 705/14 |
| 2003/0050815 | A1 | * | 3/2003 | Seigel et al. .................... 705/7 |
| 2003/0101063 | A1 | * | 5/2003 | Sexton et al. .................. 705/1 |
| 2003/0135460 | A1 | * | 7/2003 | Talegon ....................... 705/40 |
| 2003/0187677 | A1 | * | 10/2003 | Malireddy et al. ............. 705/1 |
| 2004/0001104 | A1 | * | 1/2004 | Sommerer et al. .......... 345/811 |

OTHER PUBLICATIONS

Anonymous, Information found on the website of Yahoo, Mar. 1, 2000, p. 2.*
Hurwicz, Michael, "When Small Is Better", 2002, Information found ont the website of New Architect, p. 5.*
Sullivan, Danny, "Up Close With Google AdWords", 2002, Information found on the website of SearchEngineWatch, p. 6.*

* cited by examiner

*Primary Examiner*—F. Zeender
*Assistant Examiner*—Asfand M Sheikh
(74) *Attorney, Agent, or Firm*—Woodcock Washburn LLP (57) ABSTRACT

A method is disclosed for generating a sales referral over the Internet for the sale of an asset. A first and second salesperson is provided with an account that comprises a number of clicks and a first period during which the clicks will be delivered. A click comprises an assignment on a web site of linking information corresponding to a saleperson's web site. A consumer who activates the click is transferred to a web site of the salesperson, and the click is debited from the salesperson's account.

31 Claims, 6 Drawing Sheets

FIND A HOME

Search Local Homes Listed by Agents:
Click on a city name to search homes for sale Chesapeake
Hampton
Newport News      404
Norfolk
Portsmouth
Suffolk
Virginia Beach
North Carolina
More Cities ...

LEAD DISTRIBUTION SYSTEM

FIELD OF THE INVENTION

This invention relates to an Internet-implemented system for providing leads to salespeople. More particularly, the present invention relates to dynamically assigning linking information associated with a salesperson's web site to a listing of an asset based upon prearranged criteria.

BACKGROUND OF THE INVENTION

The Internet has become the fastest new medium to reach 60% of U.S. households in recorded history—much faster than the penetration of telephone, radio, television, or cable TV. In addition, time spent on the Internet is currently the fastest-growing segment of media usage. As the Internet continues to grow in accessibility and breadth, it is becoming an increasingly important tool for business. Accordingly, the widespread availability of the Internet has made it a valuable resource for salespeople and for prospective customers alike.

Several methods of using the Internet to sell an asset have arisen. In one method, a salesperson—herein defined as any type of sales entity, such as for example one or more individuals, or a legal entity such as a corporation—may use a web site for advertising assets for sale. In another method, the salesperson may also advertise assets or may provide selection criteria (such as a search term or other means of selecting assets to view, or an asset listing itself) for an asset that another salesperson is selling. When a consumer selects such an asset or criterion by "clicking" on a tag or link in a webpage (herein referred to as a "click"), the salesperson who is actually selling the asset receives a sales lead, and in return a referral fee is generated for the salesperson whose web site generated the lead. Referral fees may be generated when the lead is generated, when the sale is completed, or in any other manner agreed to by the salespeople. In this way, a salesperson may reach a broader consumer audience for the sale of an asset, at the cost of providing a referral fee. A problem with this method is that a web site operated by an individual salesperson, or even several web sites operated by one or more salespeople, will most likely have a low number of consumer visits because such salespeople lack the advertising budget or ability to gain widespread awareness of their web sites.

Most consumers, however, visit a well-known major web site to search for an asset the consumer wishes to purchase. Such a major web site enjoys a large number of visitors, and advertises assets for sale either as a primary or secondary purpose. In other words, a major web site may have a large number of visitors to its sales advertising area, but the primary purpose of the web site—and the primary reason the web site is well known—may be for another purpose unrelated to such sales. Such a major web site may list many or all of the assets in the class of assets the consumer desires. In one situation, the major web site owns the asset and will sell it directly to the consumer. In such a situation, the major website is no different than the salesperson with a web site as discussed above, albeit with a larger number of visitors. In another situation, however, the major web site is providing a lead to a salesperson who owns or is affiliated with the asset in return for a referral fee. In such a situation, the major website is capitalizing on its large number of visitors by advertising assets that will actually be sold by a salesperson, in return for receiving a referral fee from the salesperson. In this way, the major web site may earn income in the form of referral fees, without having to expend the energy or resources involved with actually selling the asset.

The real estate industry provides an example of the aforementioned discussion of web site-provided referrals, because the real estate industry has sought to take advantage of the burgeoning use of the Internet by consumers searching for a home. According to a National Association of Realtors survey, more than 66% of homebuyers start a search for a home on the Internet. A consumer searching for a home listing generally wants access to all available listings and extensive local information when contemplating a move or home purchase. Accordingly, a home search is well suited to a database-backed web site that allows a consumer to search home listings using specific criteria on homes and locales.

The automobile industry provides another example. A consumer seeking to purchase a new or used vehicle may wish to search the Internet for listings of vehicles having desired features, price and location within a geographic area. A consumer performing such a search typically wants to see all of the vehicles meeting the specified criteria. Again, and as discussed above, such a need for information is well suited to a database-backed web site.

Returning to the aforementioned real estate example, most real estate agents use a web site and email to conduct business. Under the terms under which multiple listing systems operate—called the "Internet Data Exchange" (IDX)—any agent who participates in a multiple listing service may advertise a listing whether or not that particular agent is the "listing agent" for that listing. Heretofore, only an agent associated with the property listing was permitted to advertise the home associated with the listing. While the IDX provides an improved source of leads for real estate agents, a web site operated by a particular real estate agent or even a real estate agency is still likely to have a small number of visitors, especially when compared to a major real estate web site. Therefore, a real estate agent's ability to advertise listings for which the real estate agent is not the listing agent is offset by the low probability of receiving visitors to the real estate agent's web site. Likewise, in the automobile example discussed above, an automobile dealership web site is also likely to have a relatively small volume of visitors. If the expenses of affiliating with a major web site could be tailored to each salesperson's budget, a salesperson would benefit from the greater public exposure provided by a major web site.

Unfortunately for a salesperson with a limited advertising budget, a major web site usually provides a lead to a salesperson who has agreed to pay the highest referral fee, or for other valuable consideration. Typically, the major web site will agree to provide a lead to a specific salesperson for a set time period. Any consumer who visits the web site and selects an asset that is subject to the agreement will be referred to that salesperson. A shortcoming of such a scheme is that a salesperson who has limited advertising funds and has been outbid for leads from the major web site will not be able to receive leads from the major web site for the duration of the agreement. As a result, the salesperson has lost an opportunity for receiving leads, and the major web site has lost an opportunity for receiving additional referral fees from the outbid salesperson.

A conventional major web site currently lacks the ability to refer a lead for a single listing to more than one real estate agent in a dynamic manner. Typically, one salesperson—such as an individual or a corporation—will purchase all the leads available from the major web site for an agreed-upon period of time. Because all of the leads are consumed by a single entity, the web site again loses potential income from other salespeople. In addition, the referral fee for the web site is most likely lower than it would be if several real estate agents could constantly compete for leads from the web site on an ongoing basis.

In summary, in any business environment where there is equal access to information, such as in the current real estate or automobile industry, the most successful business is generally one that reaches a consumer at the point of need with the information sought by the consumer. Historically, a minority of the general population of consumers is in the process of purchasing a major asset, such as a home or automobile, at any given time. Compounding this problem is the low probability of a salesperson who uses his or her own web site ever reaching a substantial percentage of consumers who are in the market for the asset the salesperson is attempting to sell. A major web site in this situation will receive the majority of consumer visits, but lacks a method of distributing leads among a plurality of salespeople, thereby limiting profitability because of the lack of competition. A salesperson also suffers from this shortcoming, because a salesperson with a small advertising budget will most likely always be outbid for lead provided by a major web site. Even if a salesperson with a small advertising budget is able to acquire leads from a major web site, the time period over which the leads will be distributed will likely be short because of the salesperson's limited budget. Thus, a salesperson with a small advertising budget will only be able to receive leads from a major web site on an intermittent basis, if at all.

In view of the foregoing, there is a need for a system and method that overcomes the limitations and drawbacks set forth above. Namely, what is needed is a method and system for assigning linking information to an asset listing or selection criterion on a web site in a manner that enables a plurality of salespeople to be associated with the asset listing or criterion over a given period of time. What is also needed is a method and system for dynamically assigning linking information of a plurality of salespeople to such listing or criterion so a plurality of salespeople may receive leads over a given period of time.

SUMMARY OF THE INVENTION

The present invention overcomes these problems by providing a method and system for providing a salesperson with a means for purchasing a number of clicks that refer a consumer to the salesperson's web site. The purchase may be subject to other variables that are made available on a web site rate card and/or are agreed upon by the agent and the web site. The web site dynamically assigns a frame or link associated with listings or a category of listings (geography, for example) to an agent's web site. The assignments may be made according to prearranged criteria and the number of other participating agents. The web site debits a consumed click from a salesperson's account.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Figure 1:
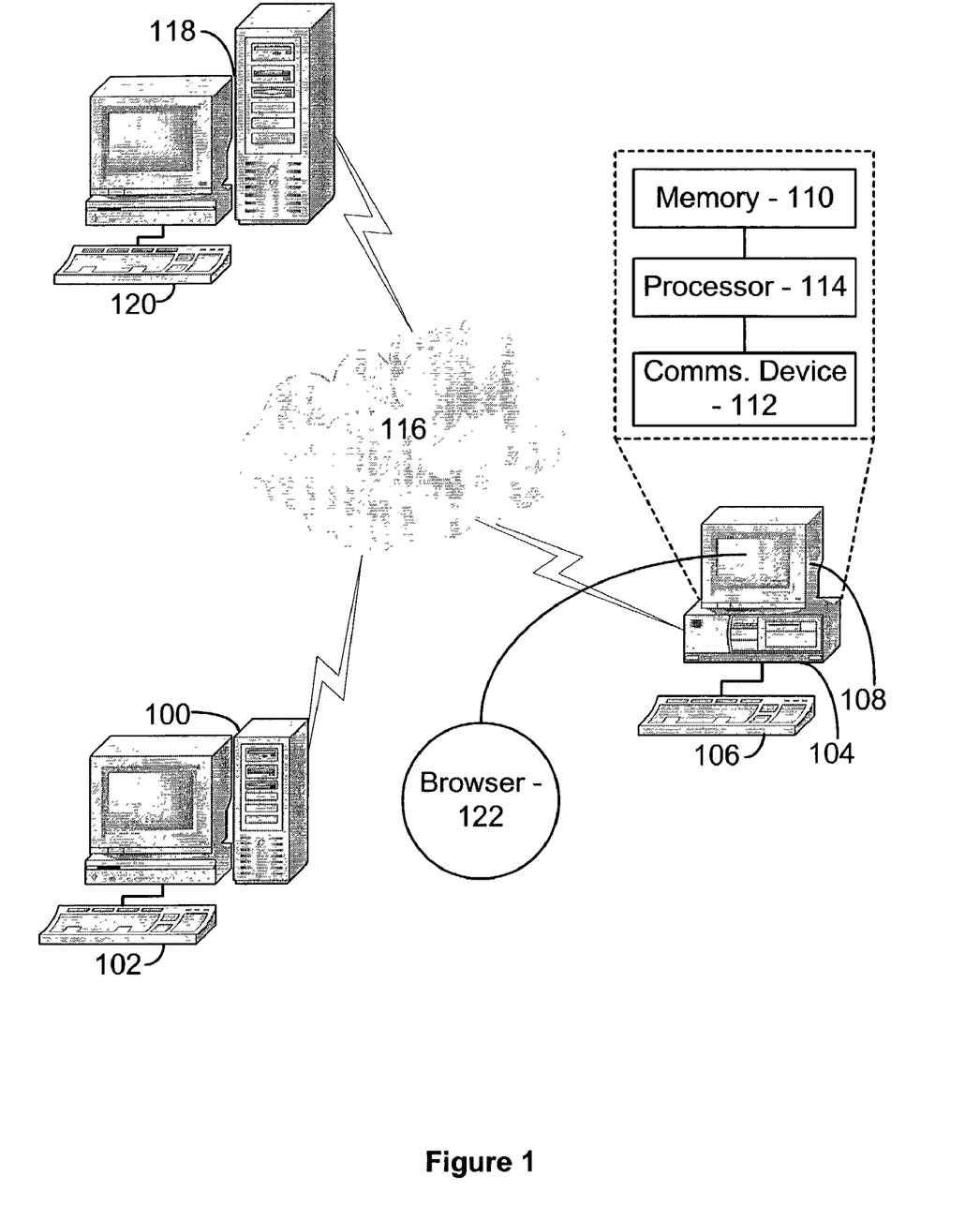
FIG. 1 is a diagram of an example of a computer network in which one embodiment of the present invention may be implemented.

FIG. 1 is a diagram of an example of a computer network in which one embodiment of the present invention may be implemented. A web server 100 provides functionality necessary to generate a web site to a local or remote computer. The web server 100 may be controlled by an input device 102, such as for example a keyboard, mouse, microphone, network connection from another computing device and/or any other form of input device. The web server 100 is operably connected to a network 116, such as for example the Internet, a wireless network or the like. The connection may be via a telephone modem, cable modem, ISDN, fiber optics, wireless network or the like. A computer 104 is also operably connected to the network 116. Like the web server 100, the computer 104 comprises an input device 106. The computer 108 also typically comprises a processor 114 for data processing, a memory 110, a communications device 112 for communicating with the network 116 and/or a display device 108 for displaying information to a user. On the display device 108 a browser 122 for displaying web pages is presented to the user. The user may interact with the web site by using the input device 106, such as for example to click on a hyperlink present in a web page as displayed by the browser 122 on the display device 108. The computer 104 may be either a desktop or laptop personal computer, a specialized computer such as a workstation, or may be a consumer product such as a cellular telephone, personal digital assistant (PDA) or the like.

A salesperson web server 113 is also operably connected to the network 116. The salesperson web server 118 also comprises an input device 120 that is consistent with input devices 102 and 110. The salesperson web server 118 provides necessary functionality to operate a sales person web site. The salesperson web site may be operated by the salesperson itself, or may be operated by another entity at the salesperson's direction. In fact, the salesperson web server 118 may be the same server as the web server 100. Other configurations of web servers 100, computers 108 and salesperson web servers 124 are possible and well known in the art, and are equally consistent with the present invention. Furthermore, in the following description methods and systems of programming and implementing web sites and the like are assumed to be known to one skilled in the art and are therefore not described in detail herein.

Figure 2:
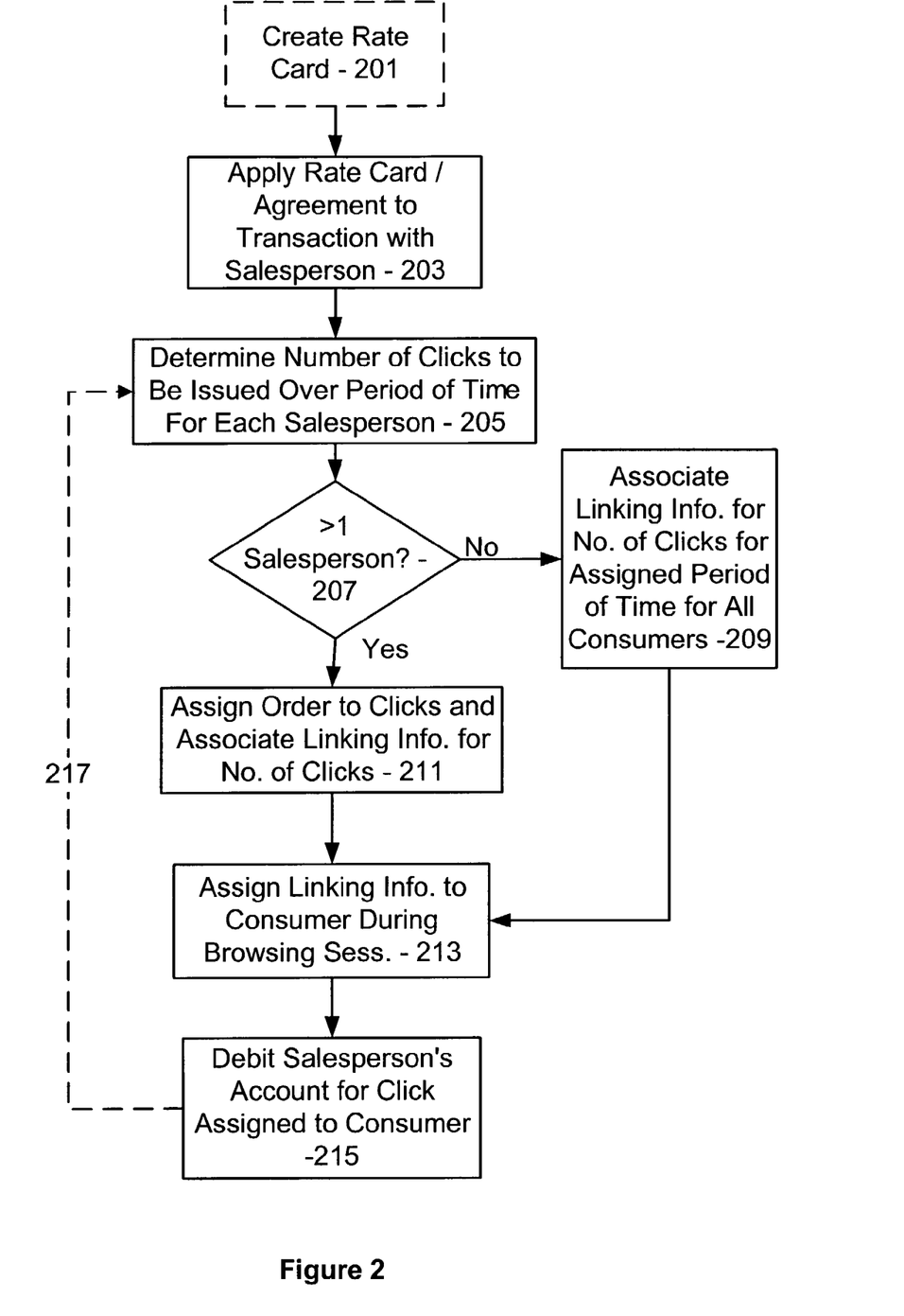
FIG. 2 is a flowchart illustrating the assigning of linking information associated with a salesperson in accordance with one embodiment of the present invention.

An embodiment of the present invention may be described with reference to FIG. 2, which is a flowchart of a method of assigning linking information associated with a salesperson in accordance with the present invention. At optional step 201, a web site creates a rate card. A rate card may be a document, electronic file or any other form of information storage. If the rate card is an electronic file, it may be stored in the web server 100, another computer or another electronic device. Within the rate card is contained any information the web site administrator considers relevant to a transaction with a salesperson in the form of an entry. For example, the rate card may contain a price per click. The rate card may also contain a number of clicks available, period of time during which the clicks may be consumed and/or the geographic area of listings to have clicks associated with the salesperson. Additionally, the rate card may contain a priority feature that allows a salesperson to be given a higher priority over another salesperson. An entry in the rate card, such as for example the price per click, may vary over time or may remain static. The web site may create one rate card for use in forming agreements with all salespeople, or may create more than one rate card for a variety of purposes. Additionally, the web site may update or revise the rate card on a continuous or periodic basis.

At step 203, the web site may perform two tasks in a transaction with a salesperson: the web site may reach an agreement with a salesperson, or the web site may apply the rate card created in step 201 to a salesperson. The agreement with a salesperson may contain any of the information discussed above in connection with the creation of a rate card discussed above in step 201, and may also contain additional terms. Applying the rate card of step 201 to a salesperson involves the web site and the salesperson reaching an agreement by selecting an entry of the rate card that will apply to the transaction. The selection of one or more entries of the rate card may comprise the entire transaction, or the web site and the salesperson may agree to additional terms not contained within the rate card. The result of either task is a transaction that has been agreed to by the web site and the salesperson.

At step 205, the web site uses the transaction of step 203 to determine the number of clicks to be issued to the salesperson and the period of time over which the clicks will be issued.

At step 207, the web site determines if more than one salesperson has been issued clicks concurrently. That is, the web site determines whether—as a result of proceeding through steps 203-205 (and optionally, step 201)—more than one salesperson has been assigned clicks for the same time period. The time period may have identical start and end times, or may involve time periods that overlap for the time relevant to step 207. More than one salesperson may have been issued clicks as a result of a single transaction, or as a result of a plurality of transactions.

If, at step 207, the web site determines that there is only one salesperson, the web site proceeds to step 209. At step 209, the web server 100 assigns linking information to the one salesperson for all consumers for the time period agreed upon in step 203. The web site then proceeds to step 213.

If, at step 207, the web site determines that there are more than one salesperson to whom clicks have been issued for the time period, the web site proceeds to step 211. At step 211, the web site assigns an order to the clicks based on the number of clicks issued to each salesperson, the time over which the clicks are to be consumed and the number of different salespeople who have been issued clicks. The order may be any order created by the web site or agreed upon by the website and each salesperson. In one embodiment, the web site may assign all of one salesperson's clicks, then followed by a next salesperson's clicks, and so on. In another embodiment, the web site may assign the clicks randomly, thereby interspersing the clicks assigned to each salesperson. In yet another embodiment, the web site may determine a pattern of clicks assigned to each salesperson based in part on the number of clicks each salesperson has been issued during the time period. Click assignments may be calculated by the web server 100, another computer or electronic device, or may be calculated remotely or even manually and then entered into the web server 100 via the input device 102. Click assignments may be revised at any time.

At step 213, the web server 100 assigns linking information associated with a salesperson's website or business in accordance with a click assignment. The linking information is information contained within the web site that, in one embodiment, will direct a consumer using the web site generated by the web server 100 to the salesperson's website generated by the salesperson web server 118. For example, as discussed in connection with FIG. 1, a user operating a computer 104 to view the web page generated by the web server 100 may view the linking information on the browser 122 as displayed on the display device 108. The user may then activate the linking information by using an input device 106, such as for example a mouse, to click on the linking information. At this point, the user is transferred to the salesperson web site as generated by the salesperson web server 118. In an alternative embodiment, the web site directs the consumer to the salesperson's website while the web page remains as a frame.

At step 215, the web site debits the salesperon's assignment of clicks when a click is consumed. A click may be accounted as consumed at any point during a consumer Internet session that is agreed upon by the web site and the salesperson. In one embodiment, a click is consumed when the consumer clicks on an object on the website that activates the linking information. In another embodiment, a click is consumed when the consumer is transferred to the salesperson's website.

After a period of time determined by the web site, the web site may return to step 205 as indicated by arrow 217. In this way, the web site can reallocate the assignment of clicks based on one or more factors, such as for example number of clicks consumed per each salesperson, number of clicks to assign over a given duration, or the like. At step 205, the web site may account for a new salesperson who may have been added while the website was performing steps 207-215.

Figure 3:
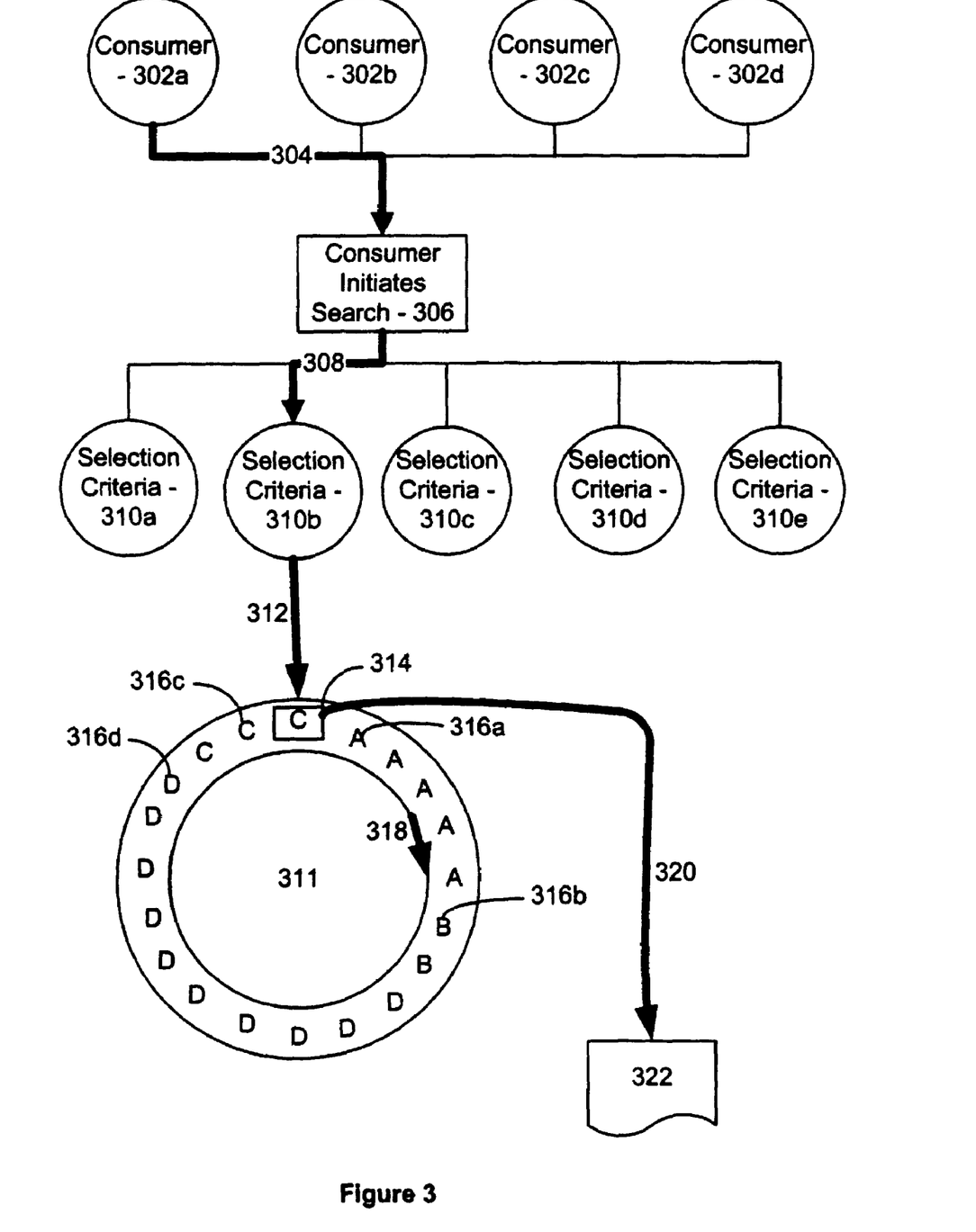
FIG. 3 is a diagram of an example of an assignment of linking information during a consumer session carried out in accordance with one embodiment of the present invention.

FIG. 3 is a diagram of an example of an assignment of linking information during a consumer session carried out in accordance with one embodiment of the present invention. Consumers 302a-d represent a plurality of consumers who have the ability to initiate a web site search at 306. As indicated by arrow 304, consumer 302a in this example initiates a search at 306. Typically, this occurs when the consumer operates the computer 104 via the input device 106 to visit the web site as displayed by the browser 122 on the display device 108. As noted above in connection with FIG. 1 however, alternate hardware configurations are possible and all are consistent with the present invention. A plurality of selection criteria 310a-e are available to the consumer during the search 306. The plurality of selection criteria 310a-e are intended to be illustrative only, and any number of selection criteria 310a-e may be made available to the consumer 302a, and each selection criteria 310a-e may include one or more criteria. In fact, in embodiments where the consumer 302a may, for example, input a text search via the input device 106, the number of selection criteria 310 available may be unbounded. In addition, a selection criterion may comprise an asset listing or other data.

Arrow 308 indicates that consumer 302a has selected selection criteria 310b. Arrow 312 indicates that selection criteria 310b yields a set of selection assignments 311. FIG. 3 represents the selection assignments 311 as a wheel rotating in a direction indicated by arrow 318, but such a representation is for illustrative purposes only. The selection assignments 311 are typically calculated by web site equipment such as, but not limited to the web server 100 and may solely reside in a memory of such equipment. In addition, the present invention may have a click assignment 311 for each selection criteria 310a-e, or may have one click assignment 311 for all selection criteria 310a-e, or any combination thereof. Assignments 316a-d represent clicks that have been assigned to four different salespeople A-D by the web site. As can be seen from assignments 316a-d, each salesperson has been assigned a different number of clicks according to a transaction reached with the web site as discussed in connection with step 203 of FIG. 2. Window 314 displays the assignment 316c that is currently set to be associated with the consumer session by the web server 100 if selection criteria 310b is selected. Arrow 320 indicates that the web server 100 has delivered the consumer to a salesperson website or frame 322. At this point, the consumer has passed into the salesperson's web site and will typically remain in the salesperson web site until terminating the web site session, although such is not required by the present invention. The web site may debit the salesperson's account for a consumed click as discussed above in connection with step 215 of FIG. 2.

Figure 4:
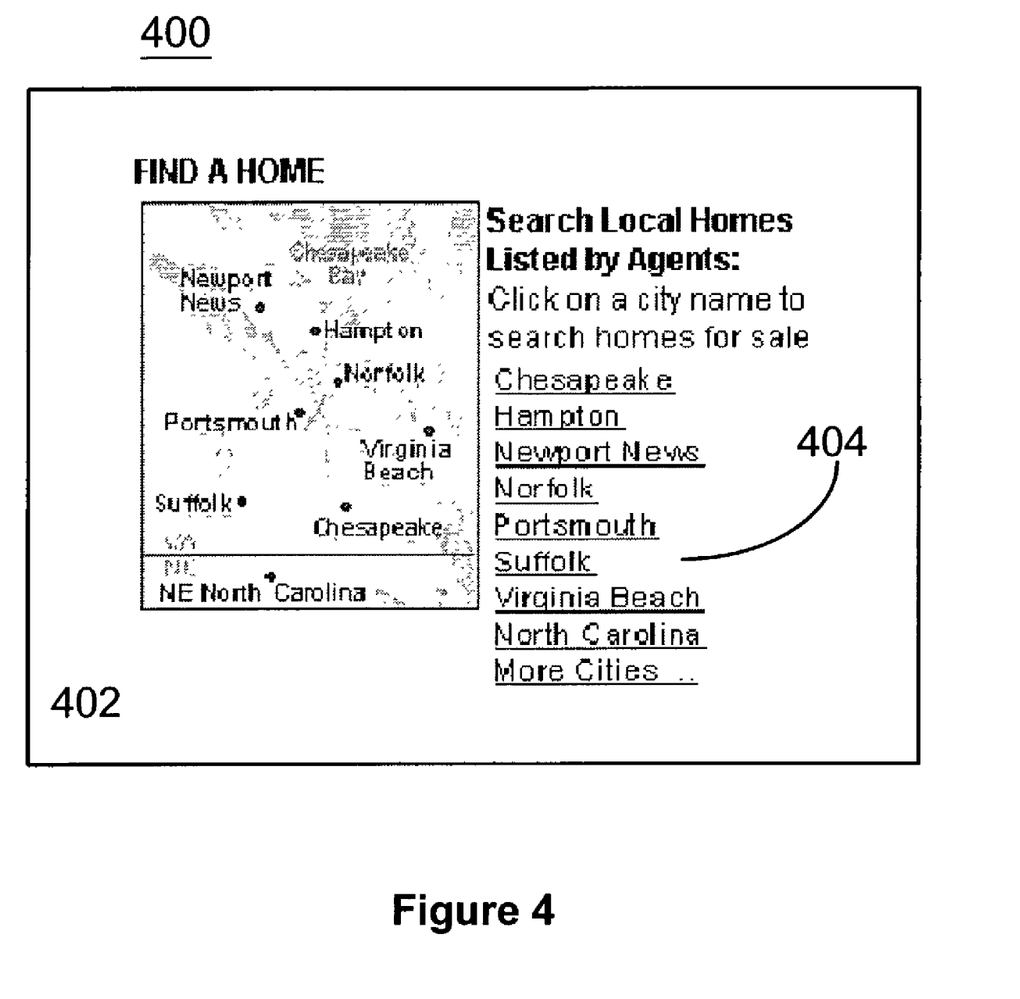
FIG. 4 is an example of a website configured in accordance with one embodiment of the present invention.

In a preferred embodiment, the present invention may be applied to home listings in the real estate industry. However, the present invention is in no way limited to real estate, as the present invention is equally applicable to, for example, providing leads for the sale of a vehicle, providing employment leads, providing leads for rental property, or any type of consumer retail application. With respect to the aforementioned real estate embodiment, a real estate agent or agency (herein referred to as an agent, for clarity) may be provided with a means for purchasing and receiving a number of homebuyer search sessions—clicks—to receive a consumer who is looking for a home listing on the web site. FIG. 4 is an example of a web site 400 configured in accordance with one embodiment of the present invention. The web site 400 has contained within its display area 402 a selection area 404 within which a consumer may use an input device 106 to select selection criteria which, in FIG. 4, are cities of home listings. The selection area 404 of such web site 400 may instead permit a consumer to select a location from a map or pulldown menu, or any other selection method that is well known in the art. The selection area 404 may offer a consumer a plurality of selection criteria in addition to the location of the desired real estate.

Figure 5:
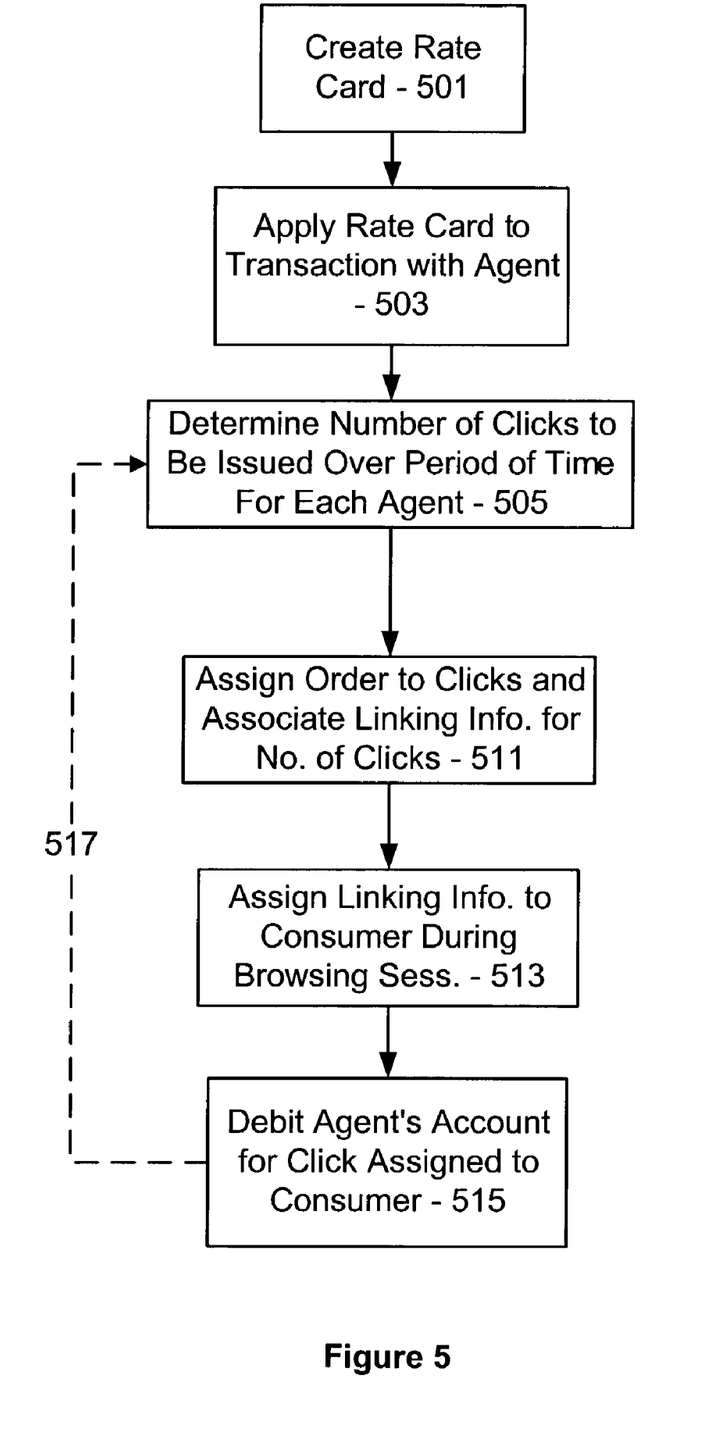
FIG. 5 is a flowchart illustrating the assigning of linking information associated with a real estate agent in accordance with one embodiment of the present invention.

FIG. 5 is a flowchart illustrating the assigning of linking information associated with a real estate agent in accordance with one embodiment of the present invention. At step 501, a web site creates a rate card. The rate card may contain one or more variables that are made available to an agent, such as for example: number of clicks, time span of delivery or length of contract, geographic region of real estate properties for which clicks may be assigned, and the like. The web site applies the rate card to a transaction with an agent at step 503. As an illustrative example, assume the following transactions occur: Agent A purchases 500 clicks to be distributed evenly over a month. Agent B purchases 10,000 clicks over a six-month period. Agent C purchases 750 clicks to be delivered as soon as possible. Agent D purchases 100 clicks to be delivered as soon as possible on a specific date.

Based on the transaction of step 503, in step 505 the web site determines the number of clicks to be issued over a period of time for each agent with whom the web site has entered into a transaction. The results of step 505 may annotated as exemplified in Table 1:

TABLE 1

| Customer | Clicks | City | Start Date | End Date |
|---|---|---|---|---|
| Agent A | 500 | Norfolk | Jul. 10, 2002 | Aug. 9, 2002 |
| Agent B | 10000 | all | Mar. 1, 2002 | Sep. 1, 2002 |
| Agent C | 750 | Virginia Beach | Aug. 1, 2002 | n/a |
| Agent D | 100 | all | Aug. 4, 2002 | Aug. 4, 2002 |

As can be seen from Table 1, the agents who purchased clicks in a transaction of step 503 are located in the table with the number of clicks purchased, as well as a geographic region as indicated by the "city" column in Table 1. A start and end date indicating the time period over which the web site disperses the clicks may also be included. An embodiment of the present invention may accommodate an unlimited number of customers, as well as an unlimited amount of transaction information. It should be noted that Table 1 is for illustrative purposes only, and its creation is not required by the present invention.

At step 511, the web site assigns an order to the clicks based on, for example, the number of clicks issued to each agent, the time over which the clicks are to be consumed, the number of different agents who have been issued clicks and/or the current or projected volume of homebuyer sessions at a given point in time. At step 513, the web server 100 assigns linking information to a consumer using a computer 104 during a browsing session. Upon the consumer activating the linking information by using the input device 106, the consumer is directed to the agent's web site which is generated by the salesperson web server 118. At step 515, the agent's account is debited for the click that has been consumed. The web site may, at step 517, update its click information by returning to step 505 and accounting for consumed clicks, and may account for any new agents that may have been added during steps 511, 513 and 515. If clicks assigned to an agent have been completely consumed, the agent may be removed from click assignments.

Figure 6:
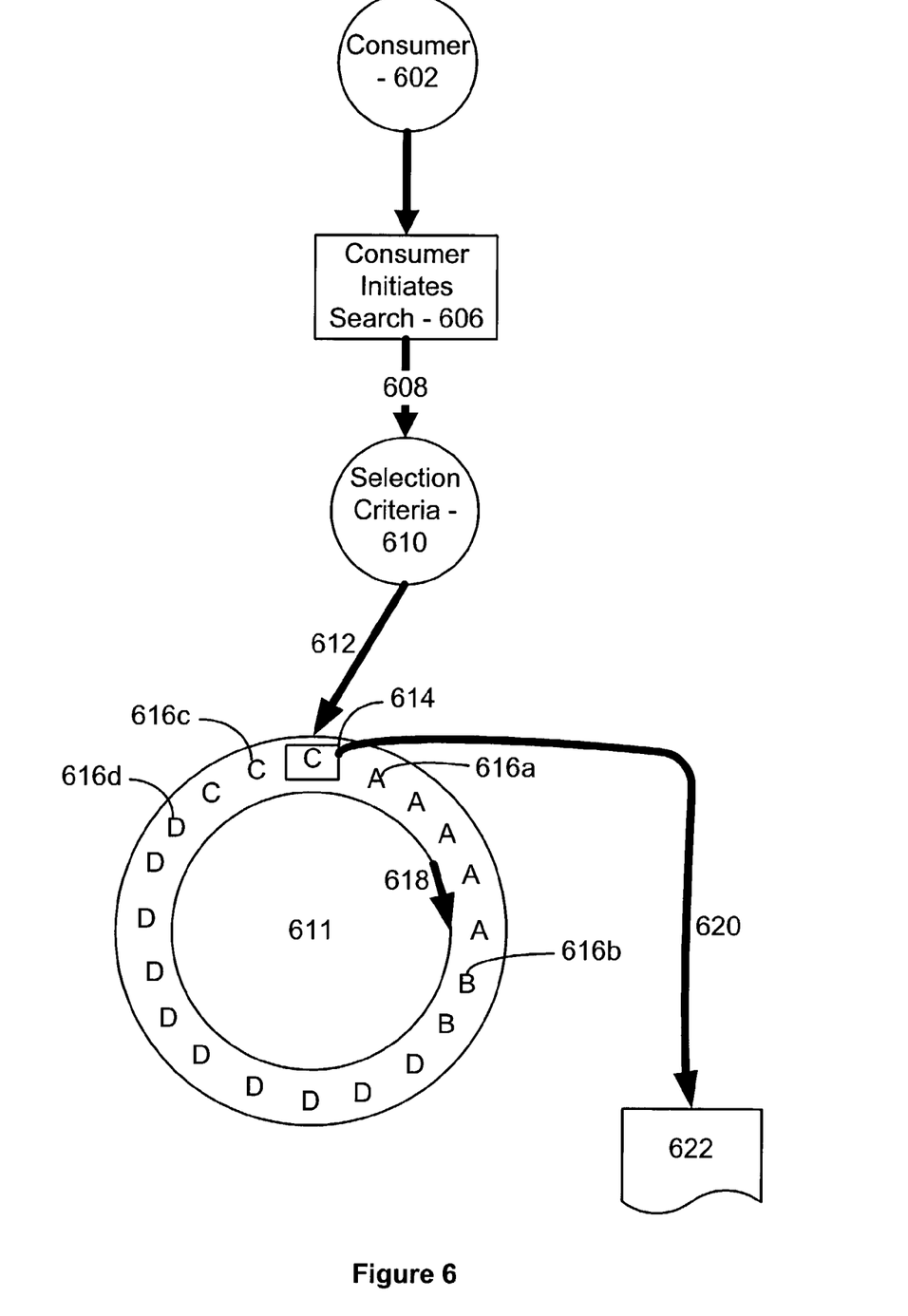
FIG. 6 is a diagram of an example of an assignment of linking information during a consumer session in a real estate context carried out in accordance with one embodiment of the present invention.

FIG. 6 is a diagram of an example of an assignment of linking information during a consumer session in a real estate context carried out in accordance with one embodiment of the present invention. A consumer 602 who is searching for a home initiates a search session 606 by visiting a web site. As mentioned above, this may be accomplished by the consumer using the browser 122 that is displayed on the display device 108 of the computer 104. The consumer 602 may select 608 selection criteria 610 using the input device 106, such as for example: a city or geographic region in which the consumer 602 wants to view properties, or all cities or geographic regions at once. The selection criteria 610 selected by the consumer 602 may yield a set of agent selection assignments 611 as indicated by arrow 612. To illustrate a click assignment in a preferred embodiment, FIG. 6 represents the selection assignments 611 as a wheel rotating in a direction indicated by arrow 618, with the assignments 616a-d dispersed thereon. However, and as discussed in connection with FIG. 3 above, such a representation is for illustrative purposes only, and any means of distributing assignments 616a-d is consistent with the present invention. As can be seen in FIG. 6, agent C is has an assignment 616c in the window 614 that is currently set to be associated with the consumer session, while other assignments 616a, b and d are awaiting delivery. The linking information then forwards the consumer 602 to an agent or broker property listings site 622 containing all available listings in the selected region as indicated by arrow 620.

Upon reaching the agent or broker site 622, the consumer may search such agent or broker site—which is generated by the salesperson web server 118—by selecting criteria for the home the consumer 602 is seeking. Criteria that may be used may include: number of bedrooms and bathrooms, price range, or zip code of the property. A period of time the consumer 602 spends at the agent or broker web site without leaving for another web site is referred to as a search session. In one embodiment, the consumer 602 remains in the agent or broker site for the duration of such search session, and all consumer 602 requests for information and email inquiries go directly to the agent associated with the agent or broker site 622, as opposed to an agent who may have a listing contract for the property. The system may, for example, account for a click when a consumer 602 using the system's web site selects a selection criteria 610, thereby activating the agent's link or frame, and leaving the system's web site.

After a period of time, such as for example one hour, agent orders may be updated for clicks delivered in the previous hour. The percentage of clicks to be delivered to each agent (for each geographic area) in the upcoming hour may be calculated, based on the quantity needed to honor each order according to the desired frequency. Agents on an "as soon as possible" status, such as agent C, may be given all clicks remaining after scheduled click commitments are met. The results of such an updating may be annotated as exemplified in Table 2:

TABLE 2

| Snapshot at 11:50 am on Aug. 4, 2002 | | | | | |
|---|---|---|---|---|---|
| Customer | Clicks | City | Start Date | End Date | Balance |
| Agent A | 500 | Norfolk | Jul. 10, 2002 | Aug. 9, 2002 | 357 |
| Agent B | 10000 | all | Mar. 1, 2002 | Sep. 1, 2002 | 3207 |
| Agent C | 750 | Virginia Beach | Aug. 1, 2002 | n/a | 587 |
| Agent D | 100 | all | Aug. 4, 2002 | Aug. 4, 2002 | 12 |

As can be seen from Table 2, some agents have more clicks to be distributed over a given time period than others, and an embodiment of the present invention may use the information represented by Table 2 to further prioritize the assignment of clicks. Such a table may be updated in connection with returning via arrow 517 to step 505, but such a table is not required by the present invention. A report may be generated that verifies actual clicks delivered by time period to an agent. Additional information about the geographic locations of consumers 602 (in aggregate), or additional information such as for example, time of day, day of week, web browser used, or the like, may be provided. Additional information, such as records tracking and audit information about every click delivered may also be provided, preferably in real time. Such information may be generated by the web server 100, or may be generated by another computer or electronic device.

Although a preferred embodiment of the present invention has been described with respect to the sale of real estate, the present invention may be used for any type of transaction. As mentioned above, variations of the present invention are possible in automotive, employment, property rental and consumer retail applications. It is also to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed:

1. A method of providing sales leads comprising a processor for:
    (a) the processor, assigning a specific number of clicks to each of a plurality of sales entities each desirous of selling an asset, the number of clicks assigned being determined by the number of clicks purchased by each sales entity, wherein a click corresponds to an occurrence of a potential buyer selecting at least one characteristic of the asset on a first web page to thereby place the potential buyer into a browser session comprising a plurality of related web pages and based on the at least one characteristic, wherein the first web page is generated by a server and displayed on a display device;
    (b) the processor, determining which sales entity is to be associated with a click based at least in part on the number of clicks purchased by each sales entity;
    (c) the processor, associating a first browser session with linking information associated with one of the sales entities in accordance with the determination in step (b) in response to a click;
    (d) the processor, debiting a click from the sales entity that is associated with the first browser session;
    (e) the processor, associating a second browser session with linking information associated with one of the sales entities in response to a click in accordance with the determination in step (b); and
    (f) the processor, debiting a click from the sales entity that is associated with the second browser session.

2. The method of claim 1, wherein the sales entity is one of a person and a business organization.

3. The method of claim 1, further comprising displaying at least a portion of the first web page within the first browser session.

4. The method of claim 1, wherein the characteristic of the asset is a geographic location of the asset.

5. The method of claim 1, wherein the characteristic of the asset is a price range of the asset.

6. The method of claim 1, wherein the asset is one of real estate or a vehicle.

7. A computer readable medium having computer executable instructions for performing a method of generating a sales lead over a communications network comprising:
    (a) generating a web page comprising a selectable characteristic of an asset using a first web server;
    (b) assigning each of a plurality of sales entities with a specific number of clicks, the number of clicks assigned being determined by the number of clicks purchased by each sales entity, wherein a click corresponds to an occurrence of a potential buyer using an input device to select the characteristic to thereby place the potential buyer into a browser session comprising a plurality of related web pages and based on the characteristic;
    (c) determining an order in which each sales entity is to be associated with the click;

(d) operating the server to associate one of the plurality of sales entities with the click according to step (c);

(e) transferring, upon detecting the click, the potential buyer into a first browser session sponsored by a first sales entity, wherein a sales lead is provided to the sales entity associated with the click when the potential buyer selects the characteristic;

(f) debiting a click from the sales entity that is associated with the first browser session; and (g) associating a different sales entity with the click, according to the order determined in step (c).

8. The computer readable medium of claim 7, further comprising operating the web server to generate a report, the report comprising a current number of clicks available to each sales entity and a remaining time period during which the current number of clicks will be available.

9. The computer readable medium of claim 7, further comprising transmitting an inquiry from the potential buyer regarding the asset to the sales entity over the communications network.

10. The computer readable medium of claim 7, wherein the characteristic of the asset is a geographic location of the assets.

11. The computer readable medium of claim 7, wherein the characteristic of the asset is a price range of the asset.

12. The method computer readable medium of claim 7, wherein the communications network is the Internet.

13. The computer readable medium of claim 7, wherein the asset is real estate.

14. The computer readable medium of claim 13, wherein the plurality of sales entities are real estate agents.

15. The method computer readable medium of 14, wherein the plurality of sales entities are participants in a multiple listing service.

16. The computer readable medium of claim 7, wherein the asset is a vehicle.

17. A system for providing sales leads for the sale of an asset comprising:

a first web page accessible over a communications network;

a file comprising a specific number of clicks purchased by each of a plurality of sales entities, wherein a click corresponds to an occurrence of a potential buyer selecting a characteristic of the asset displayed on the first web page to thereby place the potential buyer into a browser session comprising a plurality of related web pages and based on the characteristic; and a processor operably connected to the communications network, wherein the processor generates the first web page, associates each sales entity with the click only for the number of clicks purchased by that entity, causes to be displayed on a display device a second web page that is part of the browser session and is associated with one of the sales entities in response to the potential buyer selecting the characteristic, causes to be displayed on the display device a third web page that is part of the browser session and is associated with the same sales entity that is associated with the second web page, and debits a click from the same sales entity.

18. The system of claim 17, wherein the processor decrements the number of clicks assigned to the sales entity associated with the click each time a potential buyer selects the characteristic.

19. The system of claim 18, further comprising a report comprising a current number of clicks available to each sales entity and a remaining time period during which the clicks will be available.

20. The system of claim 17, wherein the processor associates only one sales entity with the characteristic at any given time.

21. The system of claim 17, wherein the processor causes at least a portion of the first web page to be displayed on the display device within the second web page.

22. The system of claim 17, wherein the characteristic of the asset is a geographic location of the asset.

23. The system of claim 17, wherein the characteristic of the asset is a price range of the asset.

24. The system of claim 17, wherein the asset is real estate.

25. The system of claim 24, wherein the sales entities are real estate agents.

26. The system of claim 17, wherein the communications network is the Internet.

27. A method of providing sales leads in a communications network used by consumers to obtain information associated with one or more real estate listings in a geographic area, each real estate listing having a corresponding hyperlink comprising a processor for:

(a) the processor, assigning a specific number of clicks to each of a plurality of sales entities associated with the network, the number of clicks assigned being determined by the number of clicks purchased by each sales entity, wherein a click corresponds to an occurrence of a potential buyer selecting at least one characteristic of a real estate listing on a first web page to thereby place the potential buyer into a browser session comprising a plurality of related web pages and based on the at least one characteristic;

(b) the processor, determining an ordered list comprising the clicks for the sales entities, the ordered list identifying a sequence in which the clicks are to be associated with each sales entity;

(c) the processor, in response to a first consumer selecting the at least one characteristic on the first web page, presenting to the first consumer real estate information corresponding to the at least one characteristic within a series of web pages that define a first browser session, wherein the first browser session is associated with a first sales entity in accordance with the sequence; and (d) the processor, debiting a click from the first sales entity.

28. The method of claim 27 further comprising:

(d) the processor, removing from the ordered list one of the clicks assigned to the first sales entity.

29. The method of claim 27 further comprising:

(d) the processor, determining a new ordered list in response to a change in the geographic area.

30. The method of claim 27 wherein the ordered list is defined based on the geographic area.

31. The method of claim 27 wherein the geographic area is defined by a zip code.

* * * * *

UNITED STATES PATENT AND TRADEMARK OFFICE
CERTIFICATE OF CORRECTION

PATENT NO.        : 7,668,725 B2
APPLICATION NO. : 10/305741
DATED             : February 23, 2010
INVENTOR(S)       : Michael W. Alston It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this

Twenty-eighth Day of December, 2010

David J. Kappos
*Director of the United States Patent and Trademark Office*